US008428657B2

(12) United States Patent
Scott (10) Patent No.: US 8,428,657 B2
(45) Date of Patent: Apr. 23, 2013

(54) SYSTEM AND METHOD FOR MAKING AN ELECTRONIC HANDHELD DEVICE MORE ACCESSIBLE TO A DISABLED PERSON

(75) Inventor: Sherryl Lee Lorraine Scott, Toronto (CA)

(73) Assignee: Research In Motion Limited, Waterloo, Ontario (CA)

(*) Notice: Subject to any disclaimer, the term of this patent is extended or adjusted under 35 U.S.C. 154(b) by 587 days.

(21) Appl. No.: 12/204,294

(22) Filed: Sep. 4, 2008

(65) Prior Publication Data

US 2009/0007026 A1    Jan. 1, 2009

Related U.S. Application Data

(63) Continuation of application No. 11/063,561, filed on Feb. 24, 2005, now abandoned.

(51) Int. Cl.
*H04M 1/00* (2006.01)
*H04B 1/38* (2006.01)

(52) U.S. Cl.
USPC ................................ 455/566; 379/433.04

(58) Field of Classification Search ............. 455/566, 455/550.1; 379/433.04
See application file for complete search history.

(56) References Cited

U.S. PATENT DOCUMENTS

| 6,527,171 | B1 * | 3/2003 | Brooks et al. ............. 235/379 |
| 6,754,504 | B1 | 6/2004 | Reed |
| 6,850,150 | B1 | 2/2005 | Ronkainen |
| 7,010,581 | B2 | 3/2006 | Brown et al. |
| 7,062,723 | B2 * | 6/2006 | Smith et al. ............... 715/860 |
| 7,283,845 | B2 * | 10/2007 | De Bast ..................... 455/566 |
| 7,286,857 | B1 | 10/2007 | Walker et al. |
| 7,312,791 | B2 * | 12/2007 | Hoshino et al. ............ 345/173 |
| 7,404,149 | B2 * | 7/2008 | Fox et al. .................. 715/810 |
| 7,554,581 | B2 * | 6/2009 | Kim ............................ 348/239 |
| 2002/0010775 | A1 * | 1/2002 | Rakavy et al. ............. 709/224 |
| 2002/0152255 | A1 | 10/2002 | Smith et al. |
| 2004/0127241 | A1 | 7/2004 | Shostak |
| 2004/0143430 | A1 | 7/2004 | Said et al. |
| 2004/0218451 | A1 | 11/2004 | Said et al. |
| 2005/0044425 | A1 * | 2/2005 | Hypponen ................. 713/202 |
| 2006/0022955 | A1 * | 2/2006 | Kennedy .................... 345/173 |
| 2006/0146075 | A1 * | 7/2006 | Weiss et al. ................ 345/660 |
| 2006/0189278 | A1 | 8/2006 | Scott |

FOREIGN PATENT DOCUMENTS

| CA | 2536999 | | 8/2006 |
| EP | 1696302 B1 | | 12/2009 |

OTHER PUBLICATIONS

Canadian First Office Action. Application No. 2,536,999. Dated: Apr. 16, 2009.
European Communication under Rule 71(3) EPC. Application No. 05101401.7. Dated: Mar. 19, 2009.

(Continued)

*Primary Examiner* — Christian Hannon
(74) *Attorney, Agent, or Firm* — Bereskin & Parr LLP/S.E.N.C.R.L., s.r.l.

(57) ABSTRACT

An electronic handheld device is described having an options module for providing a user with at least one option in the handheld device, each option associated with an enabling mode of operation of the handheld device. The device also includes an enabling module for implementing, in response to a particular option being selected by a user, an associated enabling mode of operation. Each enabling mode of operation makes the handheld device more accessible to a person having a corresponding disability.

20 Claims, 10 Drawing Sheets

OTHER PUBLICATIONS

European Search and Examination Report. Application No. 05101401.7. Dated: Jun. 21, 2005.
"Set Options for People Who are Blind or Have Difficulty Seeing Things on the Screen" [Online] Sep. 29, 2004, pp. 1-3, XP002331302 Retrieved from the Internet: http://www.microsoft.com/enable/training/windowsxp/opsblind.aspx>[retrieved on Jun. 10, 2005].
"Windows XP Tablet PC Edition 2005 Features" [Online] Aug. 25, 2004, pp. 1-3, XP002331346 Retrieved from the internet: http://www.microsoft.com/windowsxp/tabletpc/evaluation/features.mspx> [retrieved on Jun. 10, 2005].
European Examination Report. Application No. 05101401.7. Dated: Aug. 30, 2006.
European Examination Report. Application No. 05101401.7. Dated: May 22, 2007.
European Examination Report. Application No. 05101401.7. Dated: Dec. 17, 2007.
Kendall, D., "Transcript of Support WebCast: Microsoft Windows XP Accessibility Features, Mar. 7, 2003" Microsoft Support Webcasts, [Online] Dec. 26, 2003. Retrieved from the Internet: http://web.archive.org/web/20031226111648/support.microsoft.com/default.aspx?scid=/servicedesks/webcasts/en/wcd030703/wcdt030703.asp> [retrieved on Nov. 29, 2007].
"Accessibility Wizard—Windows XP Service Pack 2" Aug. 25, 2004. Microsoft, "How to obtain the latest Windows XP service pack" [Online] Oct. 14, 2004, XP007903615. Retrieved from the Internet: http://web.archive.org/web/20041014021822/http://support.microsoft.com/kb/322389> [retrieved on Nov. 29, 2007].
Co-pending U.S. Appl. No. 11/063,561, "System and Method for Making an Electronic Handheld Device More Accessible to a Disabled Person", filed Feb. 24, 2005.
Hong Kong Certificate of Grant of Patent for Hong Kong Patent Application No. 07101244.5, dated Feb. 26, 2010.
Canadian Notice of Allowance for Canadian Patent Application No. 2,536,999, dated Nov. 8, 2011.
European Intent to Grant for European Patent Application No. 05101401.7, dated Mar. 19, 2009.
European Decision to Grant for European Patent Application No. 05101401.7, dated Nov. 5, 2009.
European Certificate of Grant for European Patent Application No. 05101401.7, dated Dec. 2, 2009.
United States Notice of Abandonment for U.S. Appl. No. 11/063,561, dated Dec. 12, 2008.
United States Advisory Action for U.S. Appl. No. 11/063,561, dated Oct. 30, 2008.
United States Amendment After Final for U.S. Appl. No. 11/063,561, dated Sep. 4, 2008.
United States Advisory Action for U.S. Appl. No. 11/063,561, dated May 29, 2008.
United States Amendment After Final for U.S. Appl. No. 11/063,561, dated May 6, 2008.
United States Office Action for U.S. Appl. No. 11/063,561, dated Mar. 5, 2008.
United States Amendment for U.S. Appl. No. 11/063,561, dated Dec. 17, 2007.
United States Office Action for U.S. Appl. No. 11/063,561, Aug. 22, 2007.
Response. European Patent Application No. 05101401.7. Dated: Feb. 15, 2006.
Response. European Patent Application No. 05101401.7. Dated: Jan. 3, 2007.
Response. European Patent Application No. 05101401.7. Dated: Jul. 25, 2007.
Response. European Patent Application No. 05101401.7. Dated: Apr. 23, 2008.

* cited by examiner

Options > Device Settings > Accessibility

As there are varying degrees of visual impairment, choose how you'd like your options presented:

● Show me
○ Tell me
○ Both

Back      Next

FIG. 5C

Options > Device Settings > Accessibility

Describe your level of impairment:

● Slight visual impairment
○ Legally blind
○ Blind

Back      Next

SYSTEM AND METHOD FOR MAKING AN ELECTRONIC HANDHELD DEVICE MORE ACCESSIBLE TO A DISABLED PERSON

CROSS-REFERENCE TO RELATED APPLICATION

This application is a continuation of prior application Ser. No. 11/063,561, filed Feb. 24, 2005, the contents of which are hereby incorporated by reference.

TECHNICAL FIELD

Embodiments described herein relate to the operation of an electronic handheld device.

BACKGROUND

Mobile communication devices, or electronic handheld devices, are becoming ubiquitous in our society. Such devices can provide telephone, email, and Internet access, resulting in ever increasing mobile communication capabilities.

While generally helping people remain connected, there is one group of persons for whom the services provided by handheld devices have lagged behind. In particular, disabled persons have limited capabilities in accessing the many features provided by handheld devices. Therefore, any system or method that can make a handheld device more accessible to disabled persons would be most welcome in the field of mobile communications.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Embodiments described herein are generally directed towards making the functions and features of a mobile data communication device (electronic handheld device) more accessible to a disabled person. In particular, an electronic handheld device is described having an options module for providing a user with at least one accessibility option in the handheld device, each option associated with an enabling mode of operation of the handheld device. The device also includes an enabling module for implementing, in response to a particular option being selected by a user, an associated enabling mode of operation. Each enabling mode of operation makes the handheld device accessible to a person having a corresponding disability.

In one embodiment, software associated with the options and enabling modules is preloaded into the handheld device. As used herein, the term "preloading" indicates that the installation of the options and enabling modules is performed by an installer before the consumer procures the handheld device. For example, the installation of this software may be performed during the manufacturing process of the handheld device. Alternatively, the installation of this software can be performed by a retailer. Conveniently, if this software is preloaded, the software can run during the first power up of the handheld device by the user to improve accessibility if the user is disabled.

A handheld device operating according to embodiments described herein generates in a disabled person a feeling of control and ability to perform set-up and other tasks no matter what the degree of impairment of the disabled person. As soon as a disability option is chosen, the handheld device enters an enabling mode of operation that accommodates the disabled person.

Figure 1:
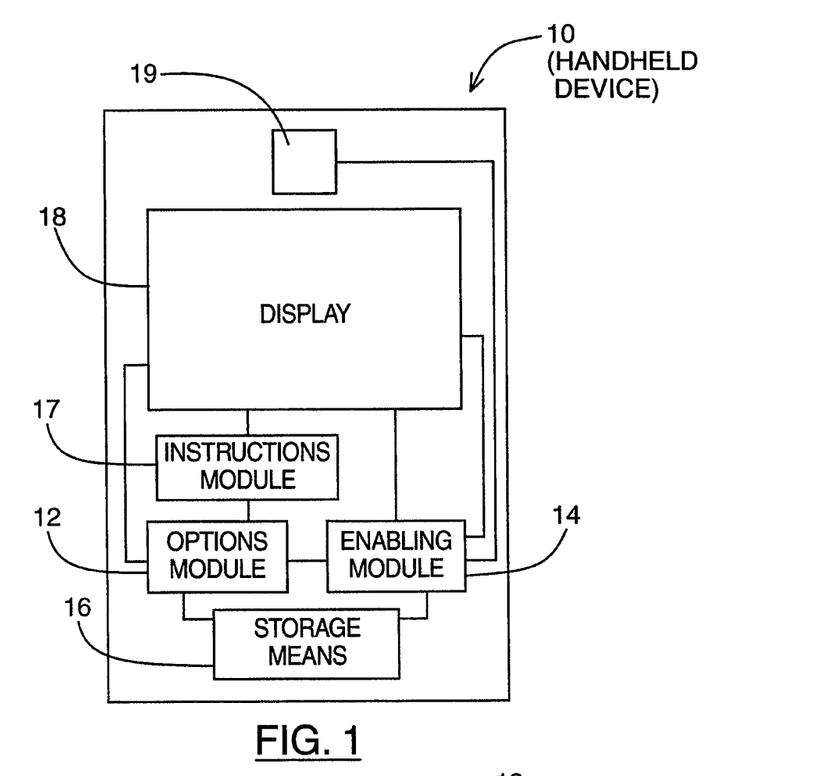
FIG. 1 shows a block diagram of an electronic handheld device.

FIG. 1 shows a block diagram of an electronic handheld device 10. The handheld device 10 includes an options module 12, an enabling module 14, and storage medium 16. The electronic handheld device 10 can also include an instructions module 17. A display 18 and a speaker 19 are used to visually and audibly communicate with the user.

The options module 12 includes hardware and associated software for providing a user with at least one option in the handheld device. Each option is associated with an enabling mode of operation correlating to a disability of the person using the handheld device 10.

The enabling module 14 includes hardware and associated software for implementing the enabling mode of operation associated with the particular option selected by a user. In each such enabling mode, the handheld device 10 interacts with the user in a manner that facilitates its use by a person with a corresponding disability.

The handheld device 10 further includes storage medium 16 for storing controller instructions corresponding to the associated enabling mode of operation. Execution of the instructions results in the handheld device 10 operating in the associated enabling mode.

Most of the software associated with the options and enabling modules 12 and 14 can be preloaded into the handheld device 10. Thus, when a consumer first powers up the handheld device 10, the software of the options and enabling modules 12 and 14 runs to provide the consumer with accessibility options. Notwithstanding the preloading of most of the software associated with the options and enabling modules 12 and 14, it should be understood that some upgrades to the software may be installed at a subsequent time. For example, some upgrades can be made available to the handheld device 10 by linking the handheld device 10 to an appropriate database, such as a wireless connection to the Internet. Data may then be sent to the handheld device 10 to provide an upgrade to the software of the options and enabling modules 12 and 14.

The instruction module 17 provides instructions for installing and operating hardware of the enabling module 14 for implementing an enabling mode of operation. In addition, the instruction module 17 can provide information on where and how to procure any additional hardware that can be used to implement an enabling mode of operation. This information, together with the instructions for installing and operating, can be provided in a manner that can be understood by an individual suffering from a disability associated with the enabling mode of operation. Thus, if a "visually impaired" option has been selected by a user of the handheld device 10, for example, the information and the instructions can be provided audibly.

Figure 2:
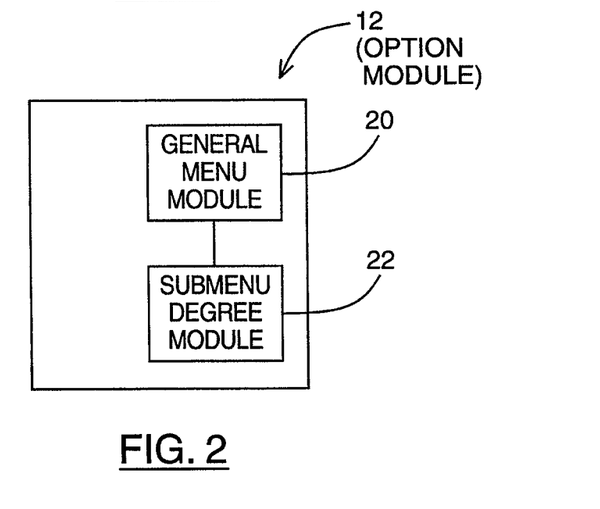
FIG. 2 shows a block diagram of the options module of FIG. 1.

FIG. 2 shows a block diagram of the options module 12 of FIG. 1. The options module 12 includes a general menu module 20 and a submenu degree module 22.

The general menu module 20 provides a menu of general disability categories, such as a visual disability category, a hearing disability category, a language disability, a speech disability, mental disability and/or a physical disability category. Thus, upon selecting one of these categories with a trackwheel, for instance, the submenu degree module 22 provides a submenu of degree of disability categories to indicate the degree of disability within a general disability category.

Besides the disability categories mentioned in the preceding paragraph, other categories may be diseases, conditions or ailments, such as Alzheimer's disease or autism. After a user selects one, or more, of these categories, the enabling module 14 implements an enabling mode of operation in which the handheld device 10 interacts with the user in a manner that facilitates its use by a person with such a disease, condition or ailment. Alternatively, the selection of a disease category, for example, could result in the handheld device 10 suggesting a different category, such as "visual impairment" that is associated with the disease.

Figure 3:
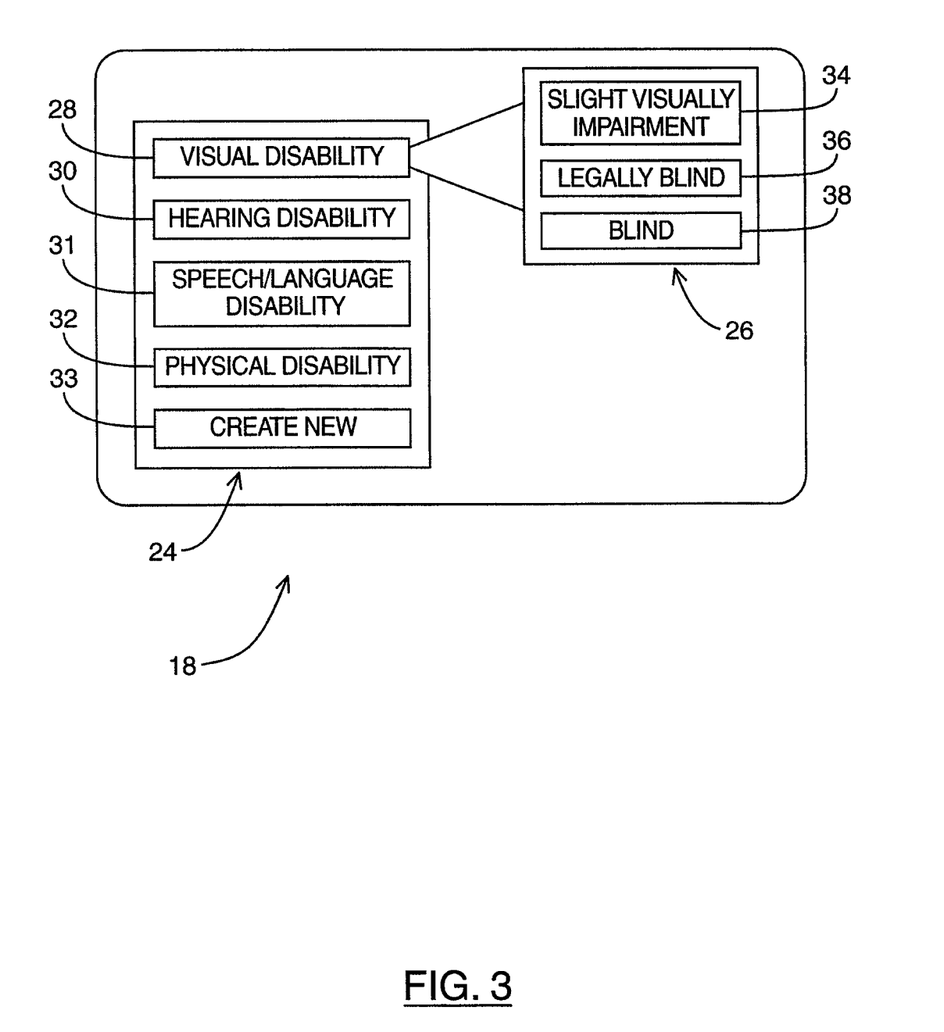
FIG. 3 shows a menu of general disability categories, as provided by the general menu module, and a corresponding submenu of degrees of disability, as provided by the submenu degree module, of FIG. 2.

FIG. 3 shows an illustrative example of a menu 24 of general disability categories, as provided by the general menu module 20, and a corresponding submenu 26 of degrees of disability, as provided by the submenu degree module of FIG. 2. In this example, the user has selected the general disability category of "visual disability" 28 from the menu 24 provided by the general menu module 20. Other general disability categories can include a hearing disability category 30, a speech/language disability category 31 and a physical disability category 32. Choosing the speech/language disability category 31, for example, may be appropriate for someone who stutters. Where the handheld device includes voice recognition, the associated enabling mode of operation might include invoking a software option that tailors the voice recognition program to persons who stutter. In addition, a "create new" 33 option allows the user to create a user defined disability category. After selecting this option, the user is given the opportunity to enter into the handheld device 10 a user defined category, such as a combination of visual disability and physical disability.

In the example shown in FIG. 3, in response to the selection of the "visual disability" 28 category by the user, the submenu degree module 22 provides a submenu 26 in which the following possible selections appear: "slight visually impairment" 34, "legally blind" 36 and "blind" 38, which represent various degrees of visual disability. It is contemplated that if someone were completely blind, this initial selection would be performed by someone else who is not.

Other general disability categories would give rise to other appropriate submenus indicative of the degree of disability within the general category of disability.

In addition to, or instead of showing the menu of general disability categories and submenu of degrees of disability on the display 18, these menus may be audibly announced via the speaker 19 to convey this information to visually impaired users.

In one embodiment, the number of possible options is $$\sum_{i=1}^{N} n_i,$$

where N is the total number of general categories, and $n_i$ is the number of degree of disability categories in the $i^{th}$ general category. Thus, one possible option is "visual disability, slight visual impairment." In other embodiments, the total number of options can be different if, for example, sub-submenus are provided, or if more than one general category can be chosen concurrently. Choosing more than one general disability category is appropriate for persons having a plurality of disabilities; for instance, someone may be both visually and hearing disabled.

In one embodiment, the enabling module 14 does not wait for the user to select a particular option from the submenu before implementing an appropriate enabling mode of operation. Thus, after the general menu module presents a menu of general disabilities, and after the user selects one option therefrom, the enabling module immediately implements an appropriate enabling mode of operation based on this selection to present the submenu. For example, if the user selects the general category "visual disability" 28, then the enabling module 14 can implement a mode that is voice activated and that provides information audibly. In particular, the submenu of degree of disability would be presented audibly after the user selects "visual disability" 28 from the menu of general disabilities.

Figure 4:
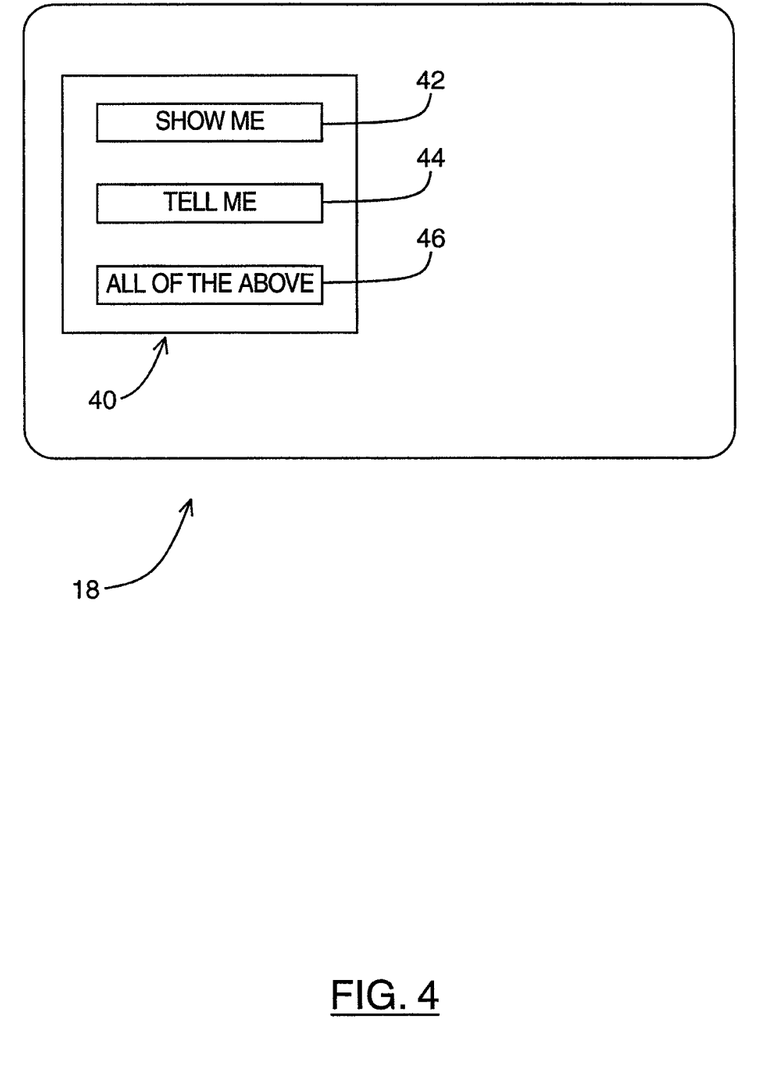
FIG. 4 shows an embodiment in which the options module of FIG. 1 provides a menu of categories associated with disabilities.

FIG. 4 shows another embodiment in which the options module 12 of FIG. 1 provides a menu 40 of categories associated with disabilities. The menu 40 includes the following options: "show me" 42, "tell me" 44 and "all of the above" 46. If a user selects the option "show me" 42, then the mobile device becomes visually enhanced, suitable for those persons that have a slight visual impairment. Alternatively, in a different embodiment, "show me" directs the mobile device to use only non-auditory means of communication, appropriate for someone who is deaf. If a user selects the option "tell me" 44, then the mobile device becomes sound enhanced, suitable for those users who have a slight hearing impairment. Alternatively, in a different embodiment, "tell me" directs the mobile device to use non-visual means to communicate, appropriate for those who cannot rely on sight to interact therewith. Finally, choosing the "all of the above" option causes the handheld device to become both visually and sound enhanced.

Each option that is capable of being selected from the menu provided by the options module 12 is associated with an enabling mode of operation of the handheld device 10. For example, when an option such as the "visual disability, slight visual impairment" option described above is selected, the associated enabling mode produces enlarged visual information, such as text or graphics, on the display 18.

Figure 5A:
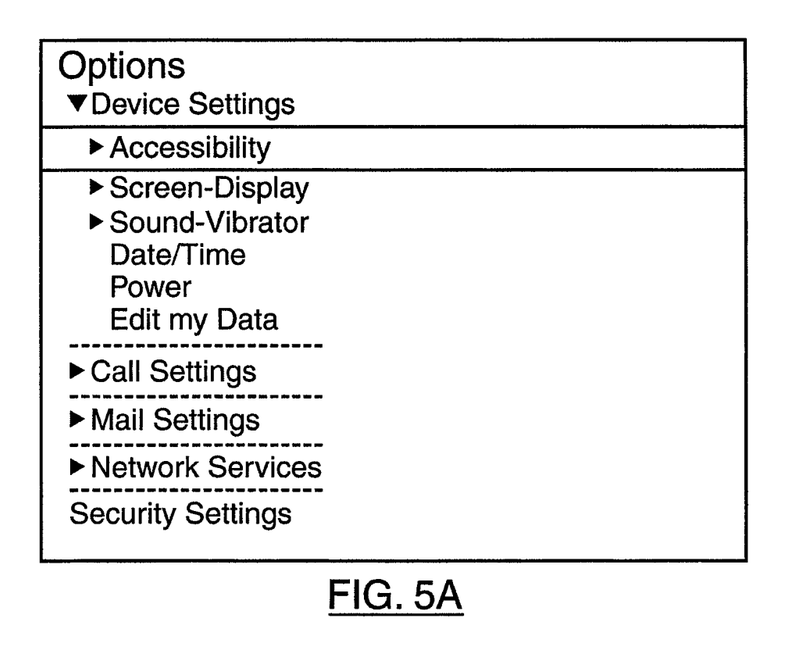
FIGS. 5A-5D show a series of displayed options for implementing an enabling mode of operation.
Figure 5B:
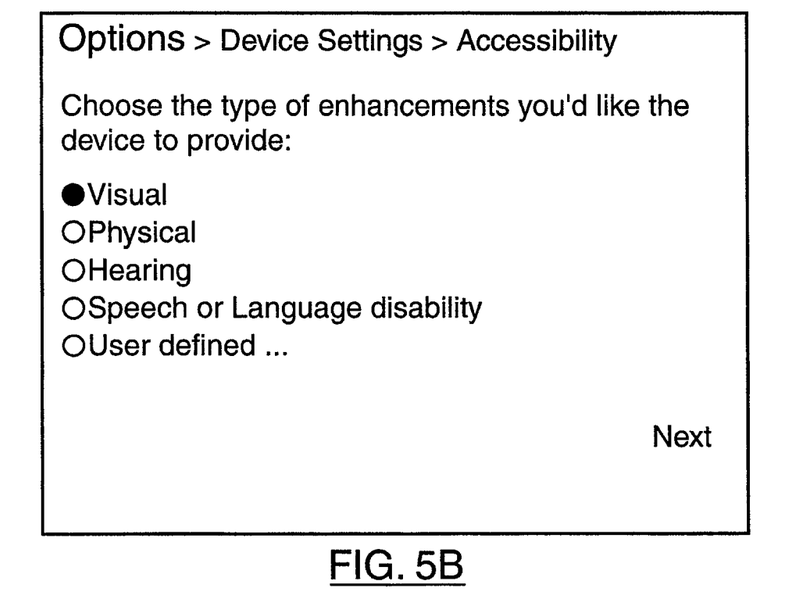
Figure 5C:
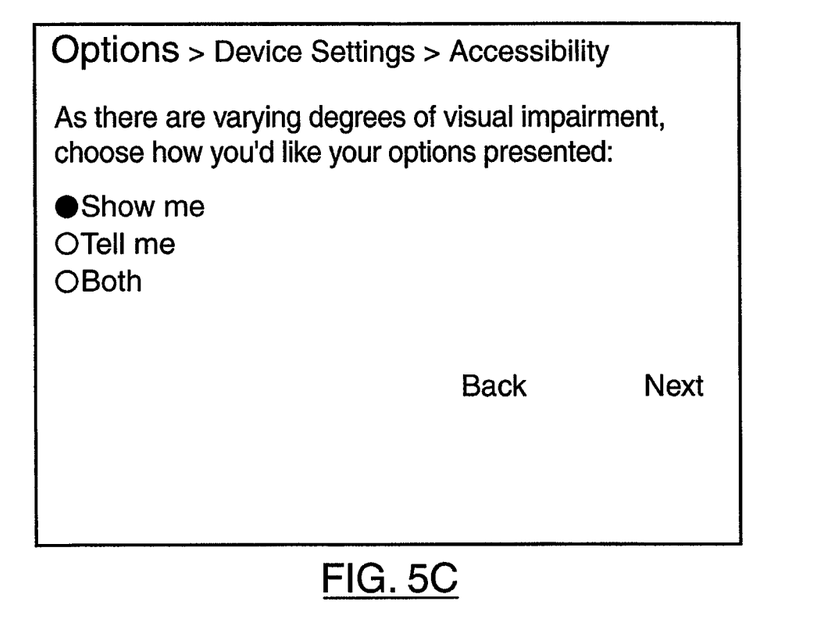
Figure 5D:
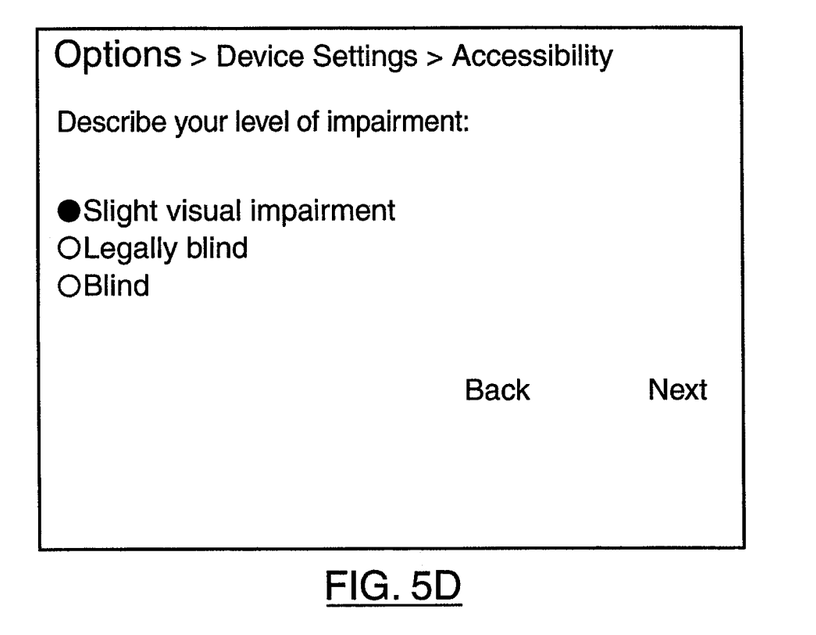

In a different embodiment, as options are presented, the handheld device deletes the relevant contents of the display, and refreshes the display with new information corresponding to an option chosen. Referring to FIGS. 5A-5D, a series of display screen shots are shown containing a sequence of options associated with disabilities. In FIG. 5A, an option "accessibility" is provided to the user to allow the handheld device to operate in an enabling mode of operation. In FIG. 5B, the general menu module 20 provides a menu of general disability categories, such as a visual disability category, a hearing disability category, a language disability, a speech disability, mental disability and/or a physical disability category. Upon selecting one of these categories with a trackwheel, for instance, the submenu degree module 22 provides a submenu of categories relating to how further options should be presented. In FIGS. 5C and 5D, the submenu degree module 22 provides menus relating to the degree of disability within a general disability category, and how these are to be presented. Selecting "slight visual impairment" from the menu in FIG. 5D, for example, could lead to further options for a user to indicate a preference, from among examples shown, of fonts, colors and line spacing. In this manner, the user can create a personal user interface that is best suited to the disability of the user.

Figure 6:
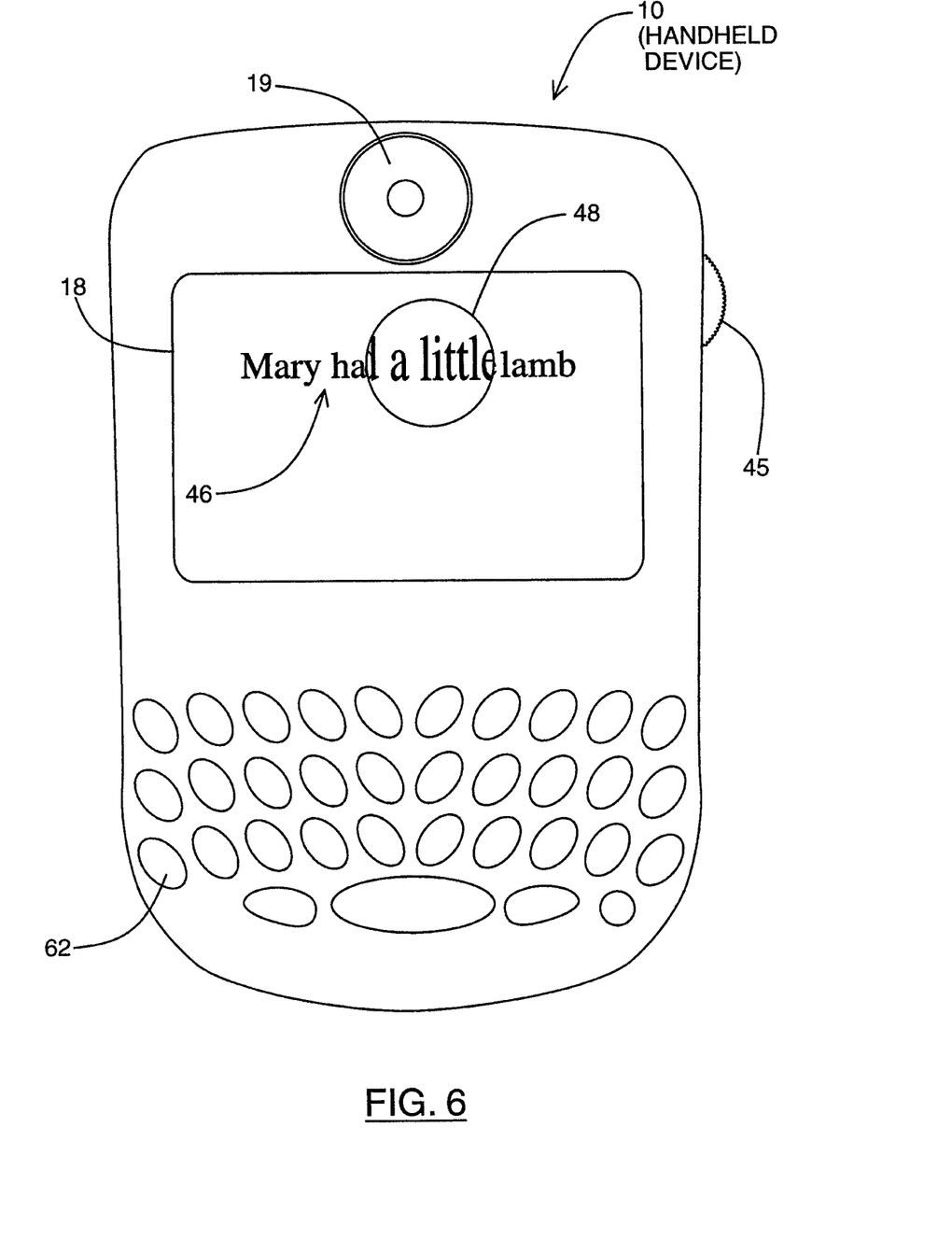
FIG. 6 shows a feature of an enabling mode associated with a visual impairment option.

FIG. 6 shows a feature of an enabling mode associated with a visual impairment option. Thus, when a user selects this option, the enabling module 14 implements an associated enabling mode having an enlarged visual information feature. In particular, when a trackwheel 45 of the handheld device is scrolled over visual information 46, such as text or graphics, on the display 18, the visual information 46 is enlarged within an enlarged field 48. The enlarged field 48 allows a person who is visually disabled to better see the visual information 46. Alternatively, or in addition to the enlarged field, the font size and/or contrast can increase.

In FIG. 6, an enlarged field is displayed to aid the visually disabled. In a different embodiment, instead of an enlarged field, a line of text selected by the trackwheel can be enlarged for aid in viewing.

In a different enabling mode, associated with an option indicative of hearing impairment, a speaker 19 produces sound with a higher volume to help the hearing impaired.

In yet another enabling mode, associated with an option indicative of total blindness, the enabling module 14 implements an enabling mode of operation in which at least one of keystrokes and menu selections are translated into speech output. Thus, when a user scrolls over some text on the display 18, for example an address in a calendar application, the handheld device 10 produces speech output corresponding to the address. In this manner, a blind person can operate the handheld device.

An enabling mode of operation for blind persons can also provide information associated with a particular text or graphic on the display 18. For example, in an address book application, which lists personal information of persons, such as names, telephone numbers and addresses, when the trackwheel is used to rollover a contact name, not only would the name be articulated audibly by the handheld device, but also information or options associated with this name. Thus, the following choices, for example, could be articulated audibly by the handheld device:
  a. "communicate with <contact name>." The handheld device could then provide an audible menu where options could be chosen relating to a mode of communication, such as telephone calling, emailing, short message servicing (SMS) and instant messaging (IM).
  b. "tell me about <contact name>."
  c. "delete <contact name>."
  d. "add ringtone to <contact name>."

Figure 7:
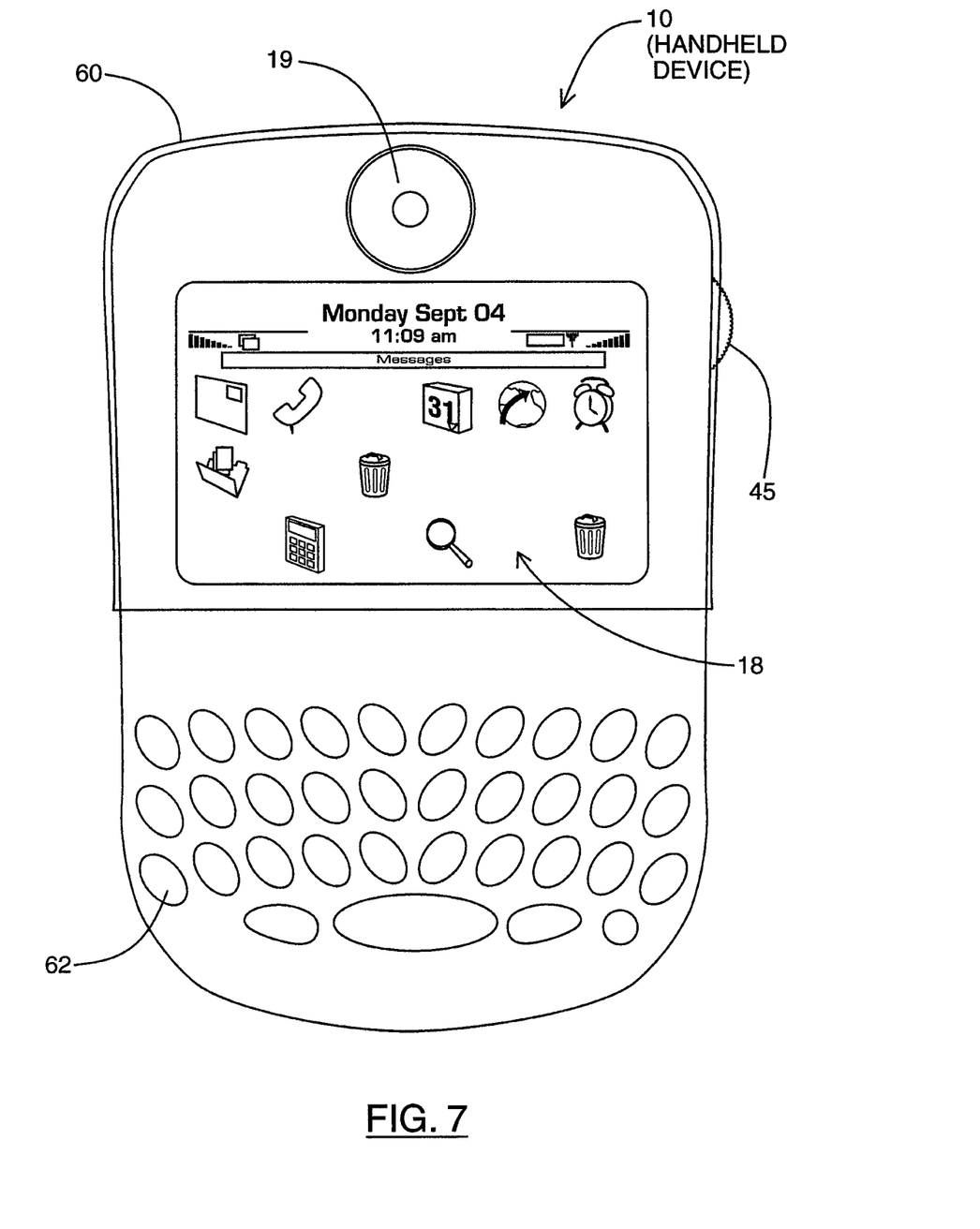
FIG. 7 shows a feature of an enabling mode associated with a physical impairment option.

Another enabling mode is associated with the "physical disability option" 32. Referring to FIG. 7, after selecting this option, a touch sleeve 60 is slipped over the display 18 and electrically connected to the handheld device 10, such as by connecting the sleeve 60 to a port (not shown) via an electrical cable (not shown). Instead of using the keys 62 or the trackwheel 45, the user can touch the display to select icons to navigate and to run programs. Such a facility can be useful to a person having no hands, for example, who must use a mouth-held stylus to tap the display 18 to enter commands.

Some of the enabling modes require special hardware, such as voice recognition hardware (e.g., microphone), and touch sleeve 60. In one embodiment, the enabling module 14 can query the user to determine if this hardware is available. If it is not, information, such as a contact phone number or email, can be provided to procure the necessary hardware.

In one example implementation, handheld device 10 is a mobile device. To aid the reader in understanding the structure of a mobile device and how it communicates with other devices, reference is made to the following description of an example implementation of a mobile device.

Figure 8:
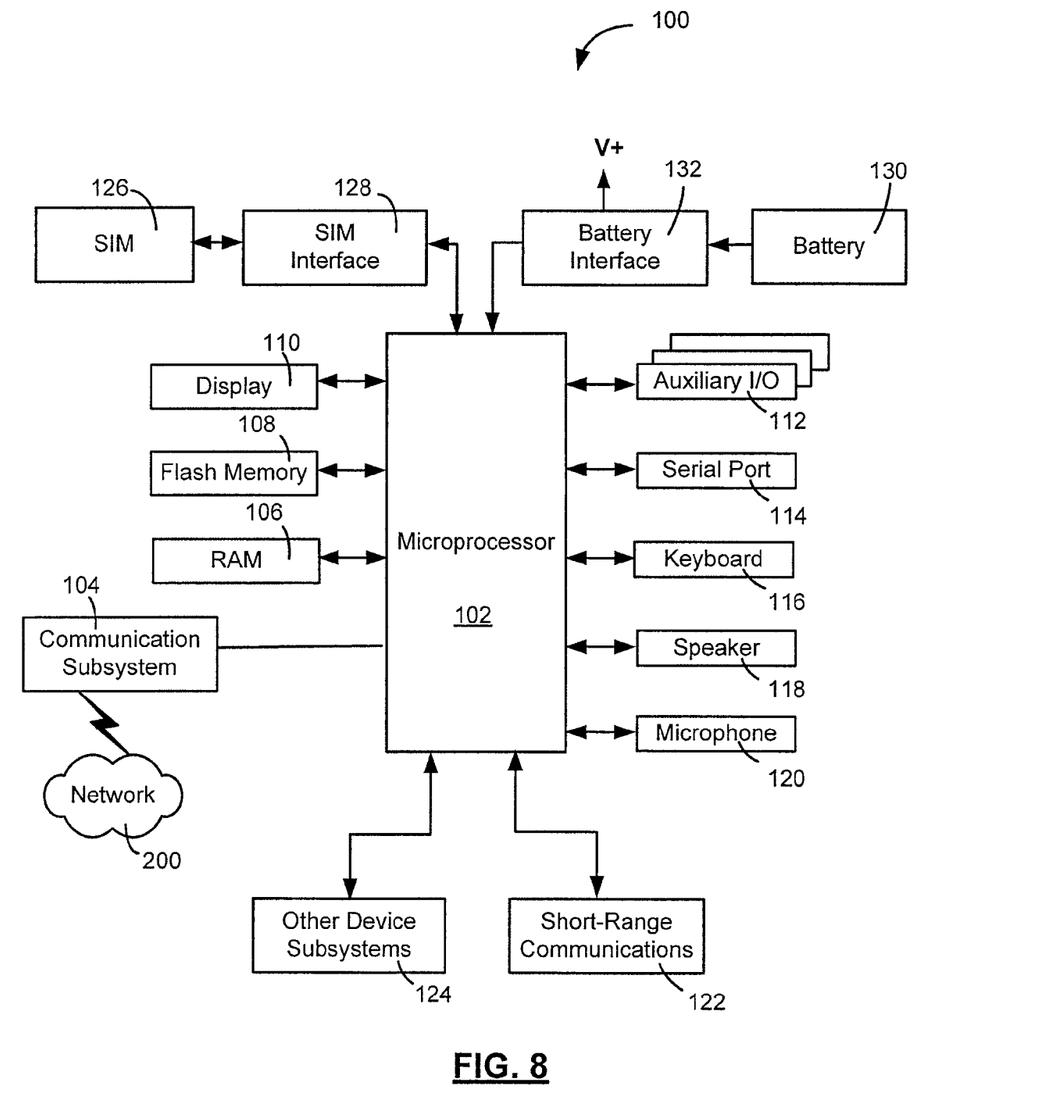
FIG. 8 is a block diagram of a mobile device in one example implementation.

Referring first to FIG. 8, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that an embodiment may use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Figure 9:
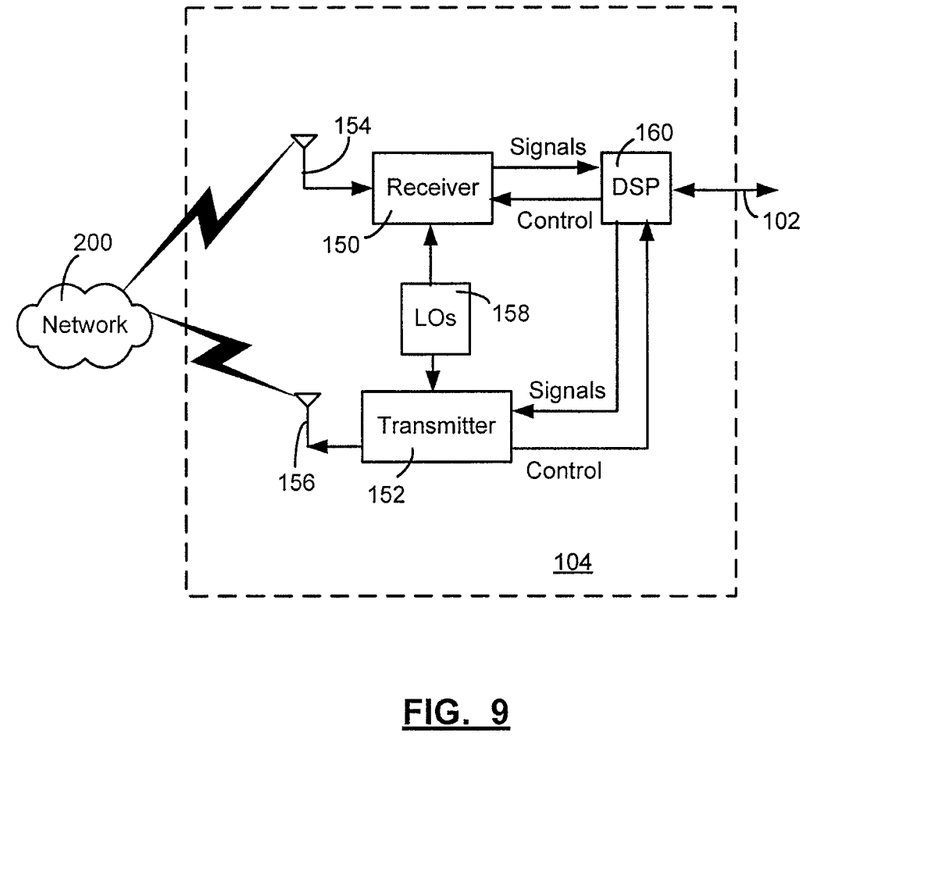
FIG. 9 is a block diagram of a communication subsystem component of the mobile device of FIG. 8.

Referring now to FIG. 9, a block diagram of the communication subsystem component 104 of FIG. 8 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 9 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Figure 10:
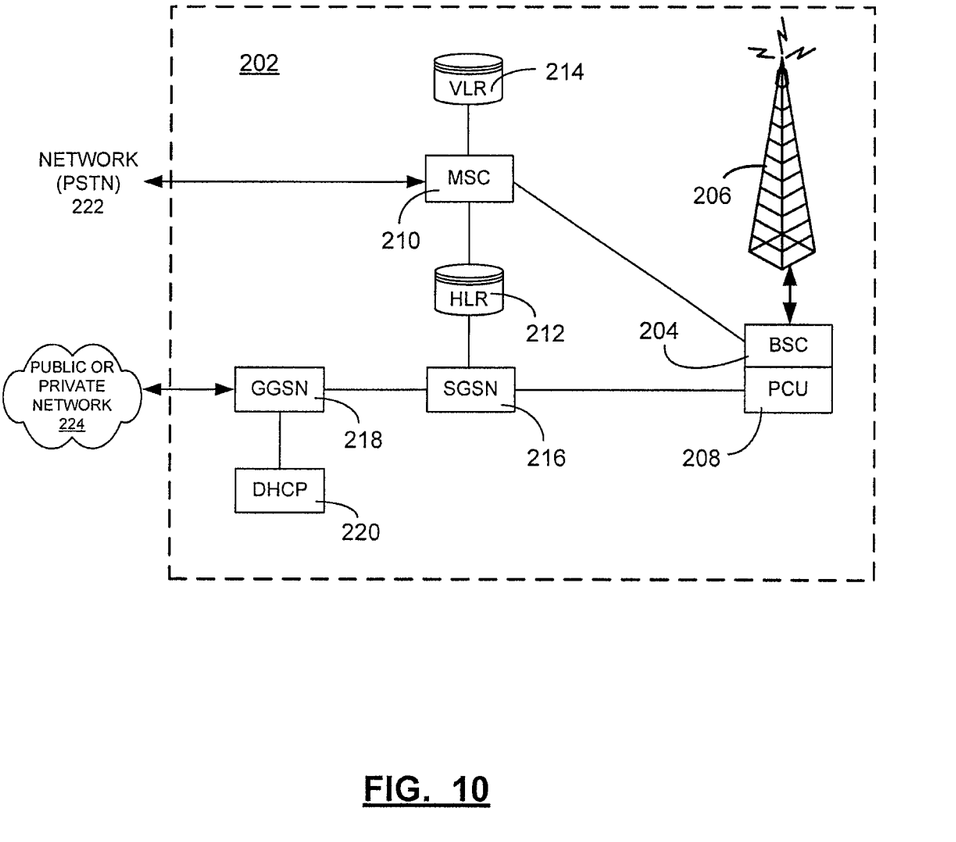
FIG. 10 is a block diagram of a node of a wireless network.

Referring now to FIG. 10, a block diagram of a node of a wireless network is shown as 202. In practice, network 200 comprises one or more nodes 202. Mobile device 100 communicates with a node 202 within wireless network 200. In the example implementation of FIG. 10, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Having described in detail a number of embodiments, including methods of operation in accordance with various embodiments, it is to be understood that this operation could be carried out with different elements and steps. It will also be understood by persons skilled in the art that other variants and modifications may be made without departing from the scope of the embodiments as defined in the claims appended hereto.

The invention claimed is:

1. A method for making an electronic handheld device more accessible to a disabled person, the method comprising:
   providing a visual enhancement option in an accessibility options menu comprising a plurality of accessibility options in a user interface of the handheld device;
   receiving an input identifying a selected accessibility option from the accessibility options menu;
   implementing an enabling mode of operation in response to receiving the input, wherein the input identifies the visual enhancement option;
   receiving a user selection of a line of text displayed at the handheld device; and
   enlarging the user-selected line of text in the enabling mode of operation, wherein non-selected lines of text are not enlarged.

2. The method of claim 1, wherein the user selection was made using a trackwheel.

3. The method of claim 1, wherein the user-selected line of text is also shown with an increase in contrast.

4. The method of claim 1, wherein the providing is performed by an options module and the implementing is performed by an enabling module, and wherein the options module and the enabling module are preloaded into the handheld device.

5. The method of claim 4, further comprising updating the options module and the enabling module.

6. The method of claim 5, further comprising linking the handheld device to a database comprising data for an upgrade, prior to the updating.

7. The method of claim 1, further comprising providing a degree of disability option in the user interface of the handheld device.

8. The method of claim 1, further comprising providing a preferences option in the user interface of the handheld device, for specifying at least one of a font, a color, or a line spacing preference.

9. The method of claim 1, wherein the handheld device comprises a storage medium for storing controller instructions corresponding to the enabling mode of operation.

10. The method of claim 1, wherein the providing is performed when the handheld device is powered up.

11. An electronic handheld device comprising:
    an options module for providing a visual enhancement option in an accessibility options menu comprising a plurality of accessibility options in a user interface of the handheld device, said visual enhancement option associated with an enabling mode of operation of the handheld device; and
    an enabling module for implementing, in response to the visual enhancement option when selected, an associated enabling mode of operation
    wherein the handheld device is configured to receive a user selection of a line of text displayed at the handheld device, and to enlarge the user-selected line of text in the enabling mode of operation, wherein non-selected lines of text are not enlarged.

12. The device of claim 11, wherein the user selection was made using a trackwheel.

13. The device of claim 11, wherein the user-selected line of text is also shown with an increase in contrast.

14. The device of claim 11, wherein the options module and the enabling module are preloaded into the handheld device.

15. The device of claim 14, wherein the options module and the enabling module are updatable.

16. The device of claim 15, wherein the options module and the enabling module are updatable after the device is linked to a database comprising data for an upgrade.

17. The device of claim 11, wherein the options module comprises a submenu degree module for providing a degree of disability option in the user interface of the handheld device.

18. The device of claim 11, wherein the options module is further configured for providing a preferences option in the user interface of the handheld device for specifying at least one of a font, a color, or a line spacing preference.

19. The device of claim 11, further comprising a storage medium for storing controller instructions corresponding to the enabling mode of operation.

20. The device of claim 11, wherein the options module provides the visual enhancement option when the device is powered up.

\* \* \* \* \*